(12) United States Patent
Byström

(10) Patent No.: US 6,561,558 B2
(45) Date of Patent: May 13, 2003

(54) TURNING DEVICE

(76) Inventor: Mattias Byström, Sockenvägen 10, 871 40 Härnösand (SE)

( * ) Notice: Subject to any disclaimer, the term of this patent is extended or adjusted under 35 U.S.C. 154(b) by 0 days.

(21) Appl. No.: 10/142,791

(22) Filed: May 13, 2002

(65) Prior Publication Data

US 2002/0171252 A1 Nov. 21, 2002

(30) Foreign Application Priority Data

May 21, 2001 (SE) .......................................... 0101782-1

(51) Int. Cl.[7] .................................................. B65G 7/00
(52) U.S. Cl. ........................ 294/17; 294/104; 254/131
(58) Field of Search ................................ 294/4, 14, 16, 294/17, 26, 104; 254/94, 105, 131

(56) References Cited

U.S. PATENT DOCUMENTS

| | | | |
|---|---|---|---|
| 1,029,892 A | * 6/1912 | Ritter | 294/17 |
| 1,467,192 A | * 9/1923 | Page | 294/17 |
| 1,493,114 A | * 5/1924 | Hodge et al. | 294/17 |
| 2,274,985 A | * 3/1942 | Jenne et al. | 294/115 |
| 2,872,888 A | * 2/1959 | Kearney | 269/165 |

* cited by examiner

Primary Examiner—Dean J. Kramer
(74) Attorney, Agent, or Firm—Burns, Doane, Swecker & Mathis, L.L.P.

(57) ABSTRACT

The invention relates to a device for performing turning of objects, in particular elongate objects which are round in cross-section, such as tree trunks (12). This is made possible by the device having two levers (1) which are interconnected but movable at least to a limited extent both longitudinally and turnably relative to each other via a hinge (8, 9). Hook members (4) are pivotally connected to the levers in such a manner that the levers can alternately be made to abut, by means of a part (3) supporting a circumferential surface, against the tree trunk while the associated hook member (4) engages the tree trunk. At the same time, the other lever can be turned and moved backwards towards the turning direction of the log so as to engage the tree trunk in a position further backwards relative to the first hook member.

12 Claims, 1 Drawing Sheet

TURNING DEVICE

Figure 1:
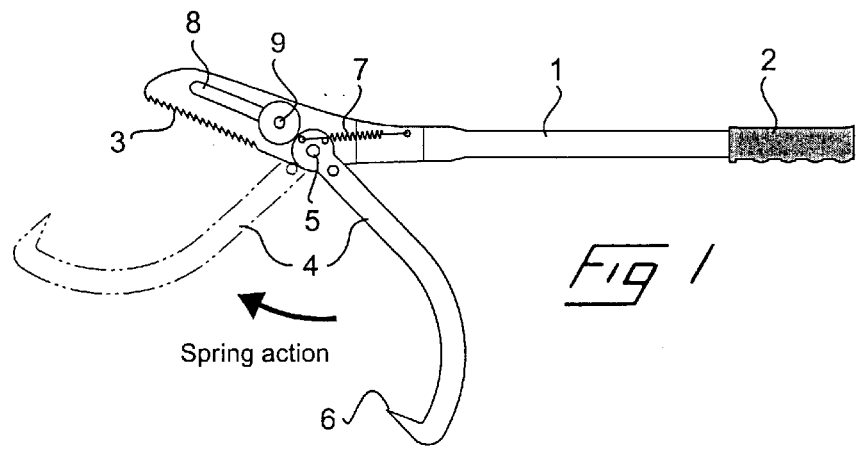

The present invention relates to a device for performing turning of objects, in particular elongate objects which are round in cross-section, such as tree trunks, comprising a rigid lever with a handle part at a rear end and, at a front end, a part supporting a circumferential surface, and a hook member which is pivotally connected to the lever in an area between the part supporting a circumferential surface and the handle part in such a manner that the device, when the lever is oriented with its front end in the intended turning direction and at the same time the hook member is directed towards the turning direction, is abuttable, by means of the lever part supporting a circumferential surface, against the object and engageable, by means of the hook member, with the object, thus allowing turning/rotating of the object by a user grasping the handle part and applying a force in the turning direction.

BACKGROUND ART

In manual forest work, different types of aids are normally used to facilitate turning of logs so as to reach the logs for limbing or move the logs by rolling. Examples of such aids are ordinary lifting hooks or tongues but also what is referred to as cant hooks of the type described by way of introduction can be used, which have an extended lever in order to increase, by means of leverage, the turning moment on the logs and thus facilitate turning. Such cant hooks are frequently provided with a plate element at their front ends, thereby also allowing use as a felling lever for felling of trees.

A problem when turning not quite symmetrical, heavy objects, such as logs, on an uneven base, is that the logs often tend to roll back to the starting position if the log has not been turned so far that a new position of equilibrium is reached. This causes a great risk of injuries, for instance, if the log rolls back onto the user or if, while trying to make the log reach a new position of equilibrium, he turns the log so far that his body takes an unsuitable working posture, which in unfavorable cases may cause strain injuries.

BRIEF DESCRIPTION OF THE INVENTION

The invention aims at eliminating the drawbacks in existing turning devices of the type mentioned by way of introduction and providing a turning device which significantly facilitates turning and moving of heavy objects and eliminates or at least reduces the risk of injuries. At least these objects are achieved by means of a turning device according to claim 1.

Thus the invention is based on the knowledge that these objects may be achieved by a turning device which comprises two levers, which each have a hook member and are interconnected via a hinge which allows displacement of the levers in the longitudinal direction relative to each other and turning relative to each other in the plane of the levers. Such a device makes it possible to turn also heavy objects on an uneven base by alternately letting the hook member of one lever being in the engaging position while the other lever is disengaged and moved towards the turning direction so as to take a new engaging position. In this way it is possible to turn the object more quickly, with less effort and without the risk of the object rolling back to its starting position. By making small and short turning movements for each engaging position of the lever, the user can all the time take an ergonomically correct working posture where the major part of the lifting operation can be carried out using his legs.

In a preferred embodiment the hinge is formed as a pivot pin which extends through an elongate slot in each lever. However, the hinge could also be formed in many other ways, for instance by a pivot pin running in a slot in one lever only while the pivot pin is fixedly connected to the other lever, or by a sleeve-shaped part which surrounds the levers from the outside but allows displacement and turning of the levers relative to each other. Many other solutions would also be conceivable within the scope of the claims.

In a preferred embodiment, the hook member is preloaded by means of a spring which strives to pivot the hook member forwards towards the front end of the lever, i.e. towards the object when the lever abuts against the object with its part supporting the circumferential surface. This is advantageous by the hook member being pivoted by the spring force towards the object and thus being capable of easily engaging its circumferential surface, but nevertheless the hook member can be easily disengaged by moving the lever towards the turning direction, for instance when taking a new engaging position.

BRIEF DESCRIPTION OF THE ACCOMPANYING DRAWINGS

Figure 2:
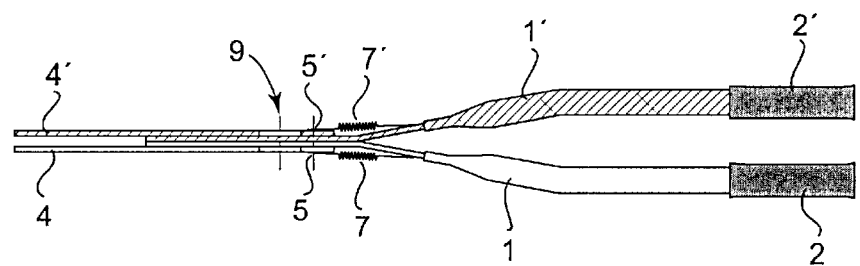
Figure 3:
Figure 4:
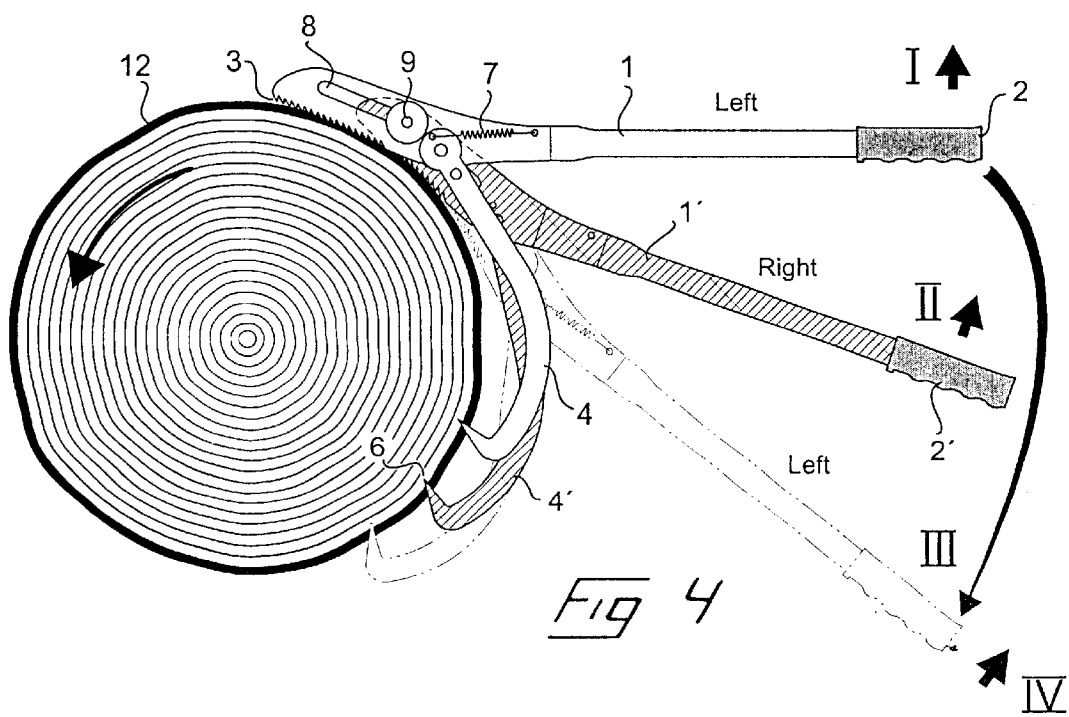

In the drawings:

FIG. 1 is a side view of a lever and a hook member according to a preferred embodiment of the invention, FIG. 2 is a top plan view of two levers according to FIG. 1 interconnected by means of a hinge connection, FIG. 3 is a top plan view of a preferred embodiment of a pivot pin which constitutes part of the hinge connection in FIG. 2, and FIG. 4 is a side view illustrating the use of a turning device according to the invention while turning a tree trunk which is schematically shown in cross-section.

DETAILED DESCRIPTION OF A PREFERRED EMBODIMENT

Reference is first made to FIG. 1, which shows a lever generally designated 1, which has a handle part 2 at a rear end and a part 3 supporting a circumferential surface and formed on the underside of a front end. To allow adequate engagement with, for instance, a tree trunk, the part 3 supporting the circumferential surface is saw-toothed. In the area between the part 3 supporting the circumferential surface and the handle part 2, a hook member 4 is pivotally connected to the lever via a hinge 5, and at its free outer end the hook member has a tip 6 serving to penetrate into the bark or wood of a tree trunk so as to allow power-transmitting engagement therein. The hook member is preloaded by means of a spring 7 arranged between the lever and the hook member and strives to pivot forwards towards the lever front end and part supporting the circumferential surface, as illustrated by the arrow and the front position of the hook member 4 indicated by dashed lines. In a completely forwardly pivoted position, the tip 6 will thus be facing the part 3 supporting the circumferential surface.

The lever as described above constitutes one of two identical, but mirror-inverted levers which are interconnected via a hinge which comprises an elongate through slot 8 at the front end of each lever and a pivot pin 9 extending through both slots. The more detailed design of the pivot pin 9 is evident from FIG. 3 and, more specifically, the pivot pin has a narrow shoulder portion 10, the diameter of which is insignificantly narrower than the width of the slots 8, and at each end of the shoulder portion a protruding portion 11, 11' serving to abut against the outside of each lever 1 and thus hold the levers adjacent to each other.

FIG. 2 is a top plan view of the complete turning device, which, as is evident, is composed of two identical, but mirror-inverted levers 1, 1', each having a hook member 4, 4' as described above. To facilitate turning of the levers relative to each other, each lever is slightly angled outwards in the area just behind the hinge 5, 5' of each hook member. In this way, the handle parts 2, 2' of the levers will be positioned at a distance from each other.

Reference is then made to FIG. 4 which illustrates in more detail the function of a turning device according to the present invention. In the Figure, a tree trunk designated 12 is to be turned or moved by rolling. The mode of procedure will thus be as follows:

I. The left lever 1 is made to abut, by means of its part 3 supporting the circumferential surface, against the tree trunk while the hook member 4 is pressed backwards against the action of the spring 7 and its tip 6 is pressed a distance into the wood. By the user applying an upward force using his left hand in the handle part 2 of the lever, the tree trunk can be made to turn in the direction of the arrow.

II. At the same time the user can, owing to the inventive hinge connection, move the right lever 1' backwards and turn it downwards so that its hook member 4' takes an engaging position a distance behind the left hook member 4 and immediately after that the user may apply, using his right hand, an upward force in the handle part 2' of the right lever.

III. When the left lever, by rolling of the log, has reached such a high position as to be uncomfortable to hold, the left hook member can be disengaged and, by turning and simultaneous displacement of the lever backwards towards the rolling direction of the log, be moved backwards to the position indicated by dashed lines a distance behind the right lever.

IV. Subsequently, the user may once more apply an upward force to the left lever. By alternately turning and moving the levers as described, also very heavy objects can be turned or rolled in a safe and ergonomically correct manner and new engaging positions can be taken without the log having to be disengaged with the ensuing risk of unintentional rolling of the log.

What I claim and desire to secure by Letters Patent is:

1. A device for turning objects, comprising:

a rigid lever with a handle part at a rear end and, at a front end, a part adapted to bear upon a circumferential surface; and a hook pivotally connected to the lever in an area between the part adapted to bear upon the circumferential surface and the handle part such that the device is abuttable, by means of the lever part adapted to bear upon the circumferential surface, against the object and engageable, by means of the hook, with the object, thus allowing turning of the object by a user grasping the handle part and applying a force in the turning direction, wherein the lever comprises a first lever member and a second lever member, and the hook comprises a first hook member and a second hook member corresponding to the first lever member and the second lever member, respectively, the first lever member and the first hook member being interconnected with but displaceable both longitudinally and rotationally relative to the second lever member and the second hook member via a hinge such that one of the first hook member and the second hook member is in turn engageable with the object while at the same time the other one of the first hook member and the second hook member is disengageable from the object so that a corresponding one of the first lever member and the second lever member is displaceable backwards relative to the turning direction while changing an engaging position of the other one of the first hook member and the second hook member, and by thus alternately displacing the first lever member and the second lever member relative to the turning direction so the corresponding one of the first lever member and the second lever member assume a new engaging position, the object is turned.

2. A device as claimed in claim 1, wherein the hinge connection between the first lever member and the second lever member comprises a pivot pin which extends through a slot in at least one of the first lever member and the second lever member.

3. A device as claimed in claim 2, wherein the pivot pin extends through slots in both the first lever member and the second lever member.

4. A device as claimed in claim 3, wherein the first hook member and the second hook member are preloaded by a spring force which strives to pivot each of the first hook member and the second hook member forward towards the front end of the lever.

5. A device as claimed in claim 4, wherein the part adapted to bear upon the circumferential surface has at least one of a fluted shape and a toothed shape.

6. A device as claimed in claim 3, wherein the part adapted to bear upon the circumferential surface has at least one of a fluted shape and a toothed shape.

7. A device as claimed in claim 2, wherein the first hook member and the second hook member are preloaded by a spring force which strives to pivot each of the first hook member and the second hook member forward towards the front end of the lever.

8. A device as claimed in claim 7, wherein the part adapted to bear upon the circumferential surface has at least one of a fluted shape and a toothed shape.

9. A device as claimed in claim 2, wherein the part adapted to bear upon the circumferential surface has at least one of a fluted shape and a toothed shape.

10. A device as claimed in claim 1, wherein the first hook member and the second hook member are preloaded by a spring force which strives to pivot each of the first hook member and the second hook member forward towards the front end of the lever.

11. A device as claimed in claim 10, wherein the part adapted to bear upon the circumferential surface has at least one of a fluted shape and a toothed shape.

12. A device as claimed in claim 1, wherein the part adapted to bear upon the circumferential surface has at least one of a fluted shape and a toothed shape.

* * * * *